United States Patent [19]

Herb

[11] 4,198,972
[45] * Apr. 22, 1980

[54] BLOOD AND BLOOD COMPONENT STORAGE BAGS

[75] Inventor: John R. Herb, Bethlehem, Pa.

[73] Assignee: Pharmachem Corporation, Bethlehem, Pa.

[*] Notice: The portion of the term of this patent subsequent to Aug. 29, 1995, has been disclaimed.

[21] Appl. No.: 896,637

[22] Filed: Apr. 17, 1978

[51] Int. Cl.² ............................ A61M 5/00; A61J 1/00
[52] U.S. Cl. ................................ 128/214 D; 128/272
[58] Field of Search ......... 229/56; 128/214 R, 214 D, 128/272, DIG. 24

[56] References Cited

U.S. PATENT DOCUMENTS

| | | | |
|---|---|---|---|
| 2,895,475 | 7/1959 | Cole | 128/272 |
| 2,896,619 | 7/1959 | Bellamy | 128/214 D |
| 3,018,189 | 1/1962 | Traver | 204/168 |
| 3,058,799 | 10/1962 | Rowles, Jr. | 128/214 D |
| 3,064,647 | 11/1962 | Earl | 128/214 D |
| 3,079,920 | 3/1963 | Bellamy, Jr. | 128/214 D |
| 3,081,214 | 3/1963 | Strome | 56/272 |
| 3,107,748 | 10/1963 | Alder et al. | 206/484 |
| 3,110,308 | 11/1963 | Bellamy, Jr. | 128/214 D |
| 3,127,892 | 4/1964 | Bellamy, Jr. et al. | 128/DIG. 24 |
| 3,211,144 | 10/1965 | Nehring | 150/1 |
| 3,256,981 | 6/1966 | Kurtz | 206/56 |
| 3,284,331 | 11/1966 | McBride et al. | 204/168 |
| 3,360,412 | 12/1967 | James | 56/272 |
| 3,472,369 | 10/1969 | Schuster | 206/63.2 |
| 3,491,935 | 1/1970 | Trotter, Jr. et al. | 229/48 T |
| 3,554,256 | 1/1971 | Anderson | 128/214 D |
| 3,736,933 | 6/1973 | Szabo | 128/216 |
| 3,746,001 | 7/1973 | Ralston, Jr. | 128/214 D |
| 3,788,374 | 1/1974 | Saijo | 150/1 |
| 3,914,521 | 10/1975 | Beatty et al. | 156/272 |
| 3,924,748 | 12/1975 | Braverman | 206/631 |
| 3,951,148 | 4/1976 | Herb | 128/272 |
| 3,963,026 | 6/1976 | Herb | 128/272 |
| 3,986,506 | 10/1976 | Garber et al. | 128/214 D |
| 3,986,507 | 10/1976 | Watt | 128/214 D |
| 4,112,989 | 9/1978 | Grode et al. | 128/214 D |

FOREIGN PATENT DOCUMENTS 2312263 12/1976 France .................. 128/214 D

OTHER PUBLICATIONS

"Corona Discharge Treatment of Polyolefin Films", *Plastics Engr.* Feb. 2, 1977, pp. 50–52, Soc. Plastics Engrs.

Primary Examiner—Robert W. Michell
Assistant Examiner—Thomas J. Wallen
Attorney, Agent, or Firm—Miller & Prestia

[57] ABSTRACT

A bag for storing blood platelets consisting of a sterilizable, flexible closed polyolefin container having at least two inlets at the top thereof forming part of said closed container, each of the inlets being hermetically enclosed by a bag-like protective closure that is integral with the bag and formed by heat-sealing oxidized surfaces of polyolefin so that the seal is peelably separable to expose each of the inlets. There is further provided a burstable seal below at least one of the inlets.

17 Claims, 4 Drawing Figures

BLOOD AND BLOOD COMPONENT STORAGE BAGS

This invention pertains to a bag for storing blood and blood components by freezing for an extended period of time. More particularly, this invention relates to a container for storing blood platelets.

Sterilizable, flexible closed plastic bags of a variety of shapes and forms have been used as storage containers for red blood cells and other blood components. In many cases, these bags have been adapted to particular uses by virtue of specific inlet and outlet configurations in combination with puncturable diaphragms and integral tubing.

It is known to provide parenteral solution bags which include a medically sealing mechanism in which the outlet is sealed with rubber plugs. This type of sealing has many disadvantages, e.g., it is inconvenient to open the seal, the seal is subject to contamination after it has been opened, the outlet opening is subject to contamination when opened, and sterilization of the rubber plug portion is difficult to effect.

It is further known to provide a parenteral solution bag having a hermetically sealed tab of polyvinyl chloride which can be peelably sealed. However, the utilization of vinyl chloride monomer has been found to create problems since the vinyl chloride monomer tends to leach out into the solution. The vinyl chloride monomer is subject to serious objection as carcinogenic; also, it is not entirely suitable for use at low temperatures since it is lacking in resistance to freeze-thaw stress.

The U.S. Pat. to Herb No. 3,951,148 discloses a storage bag and glycerolizing set for red blood cells, which includes means for hanging an inlet-outlet fitment at the top. All of the ports are of a large diameter and the storage bag is particularly useful for storing red blood cells and for glycerolizing them.

A further U.S. Pat. to Herb No. 3,963,026 discloses a bag for storing frozen red blood cells which includes an inlet fitment having a neck provided with an enlarged portion on its outer diameter, composed of polyethylene. A connection is provided for linking this fitment to a polyvinyl tube, whereby the blood storage bag may be interconnected with a variety of other blood storage or treatment devices.

Particular problems have been encountered in the past in the storage of platelets, which are a blood component utilized to facilitate coagulation in the case of certain blood conditions, where the blood either will not coagulate, or will not coagulate to a sufficient or desired degree. In the treatment of such conditions it is highly desirable to produce, maintain and store a platelet concentrate which may be thawed and taken up in plasma to produce a product which may be administered intraveneously to effect hemostasis.

Platelets are usually produced by centrifugation of whole blood. They constitute an entirely different fraction than red blood cells, and are very substantially more fragile than red blood cells. Further, it has been found that injury to an individual platelet presents a particularly serious problem because it tends to release an agent causing the destruction of other platelets in the same container. This is not true to any substantial extent with respect to the storage and handling of red blood cells.

Accordingly, it is extremely important to provide a means for handling, freezing, storing, and for ultimately thawing platelets and combining them with blood plasma in order to produce a platelet medium which may be administered intravenously to effect hemostasis in human patients. In the treatment of patients with platelet-rich plasma mixtures, 80 to 90% of the units contained in fresh whole blood are present, and several units are administered to the patient. The platelets are obtained by prolonged centrifugation, and may be frozen and stored for over extended periods of time, prior to use. They are used primarily, after having been combined with plasma, for the treatment of thrombocytopenic hemorrhage, and the platelet-plasma mixture is also given to patients with thrombocytopenia, even without actual bleeding.

It is particularly important to provide such a means, in a form which can be conveniently used, which provides for ready and reliable freeze-storage, and which protects the fragile platelets against injury in use and storage.

An object of the present invention is to provide a platelet storage bag which protects against platelet injury, has a simple and reliable sealing mechanism, not subject to contamination at the inlet or outlet of the parenteral solution either when hermetically sealed or when unsealed. Another object is to provide a platelet freeze storage bag which is sterilizable as a whole under hermetically sealed conditions.

Another object of the invention is to provide a blood bag capable of having its tab peeled easily and reliably, which may conveniently be handled when open, and which may be handled from a hygienic point of view both in the storage and freezing operation and in the ultimate steps of thawing, mixing with plasma to form a platelet concentrate, and administration to the patient.

With respect to the materials which are used for blood bags in accordance with this invention, a polyolefin, especially polyethylene is the material of choice. Other materials such as polyvinyl chloride have heretofore been used but are now contra-indicated as emitting chemicals that are possibly carcinogenic in nature, particularly when maintained in contact with stored blood over an extended period of time.

BRIEF DISCLOSURE OF THE INVENTION

It has now been discovered that the foregoing and other objects are attained, in accordance with the present invention, by a storage bag in the form of a container having a peelable seal formed from a polyolefin having at least one surface oxidized so as to be peelably sealed. Preferably, each port of the container is provided with a peelable seal tab forming a protective closure. Also, at least one of the ports is provided with a burstable seal below the port.

The term "burstable seal" refers to a low strength peelable seal which can be broken by the application of fluid pressure. In a blood storage bag the burstable seal is preferably of a strength wherein the squeezing of the bag with liquid and/or entrapped air provides sufficient pressure to open or break the seal.

It has been found that when the surface of polyethylene is oxidized by corona discharge or by impinging an open oxidizing flame on the polyolefin surface, for example, the polyolefin is capable of being heat-sealed and then easily peeled after sealing. One method of oxidizing the polyolefin is disclosed by R. M. Sonkin in "Corona-Discharge Treatment of Polyolefin Films," *Plastics Engineering,* February, 1977, pp. 50–52.

Surprisingly, it has been found that there is better platelet recovery from a platelet storage bag in accordance with this invention than in the past, because essentially no degradation takes place when the bag of this invention is utilized.

Furthermore, it has been found that platelet storage bags according to the present invention have less wrinkling along the seal lines than heretofore, and the tendency to form stress lines along the inner edge of the seal is reduced.

The placement of the ports about each of the upper corners of the bag has been found to be particularly advantageous not only in manufacturing the bag but also in permitting separate sealing of the ports from the contents of the bag after filling. Also, it is easier to place a burstable seal bridging diagonally across below the ports, preferably below the evacuation port.

Reference is made to the drawings and to the following detailed description thereof, which are intended to be illustrative but not to limit the scope of the invention which is defined in the appended claims.

DESCRIPTION OF THE PREFERRED EMBODIMENTS

Figure 1:
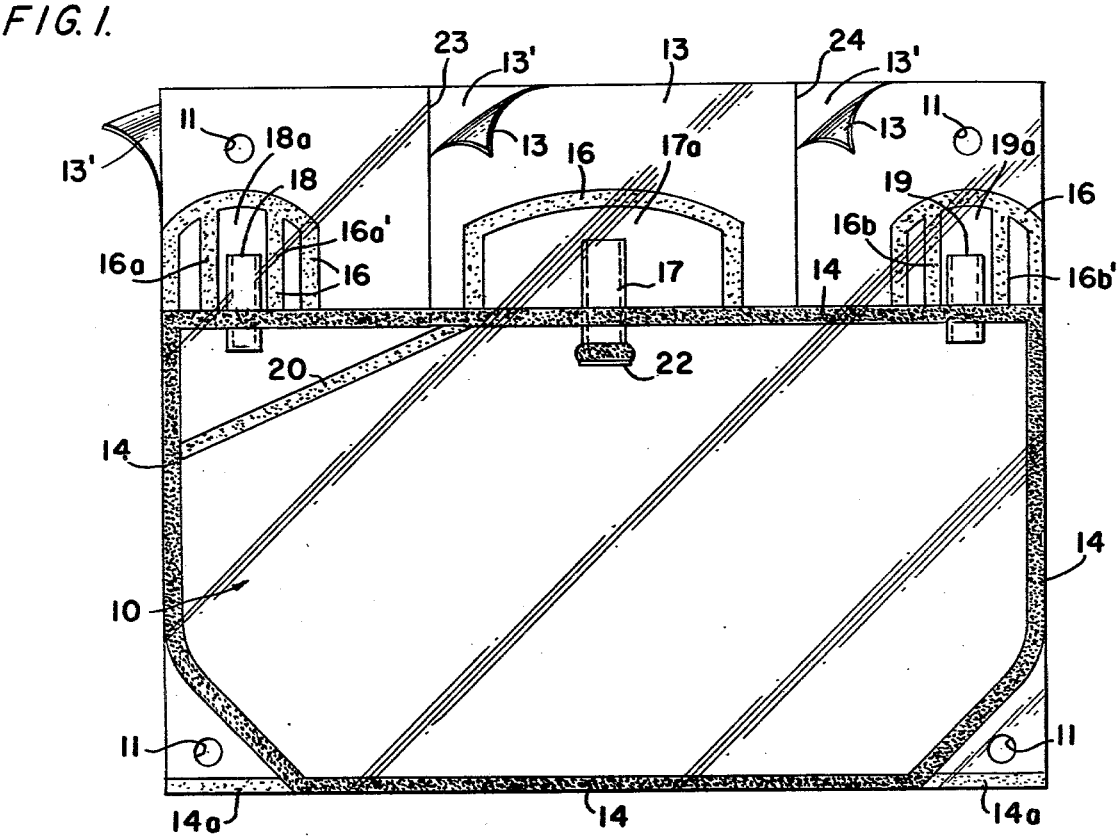
FIG. 1 is a face view of one specific form of platelet storage bag according to the present invention.

It will be appreciated that in all of the drawings the bag comprises either at least two substantially identical sheets of plastic material formed together or a simple sheet folded over and formed together to create an envelope-like enclosure. The front sheet is clearly illustrated, and the rear sheet is not visible in the drawings except where its shape or configuration may differ from that of the front sheet.

Turning now to FIG. 1, the sterilizable, flexible polyethylene bag selected for illustration herein comprises a pair of polyethylene sheets 13, 13' and is optionally provided with corner holes 11 for hanging the bag either in an upright or in an inverted position. The confines of the bag 10 are defined by weld seal 14, which seals the sheets 13, 13' together. Bag 10 as shown also includes a hollow delivery tube 18, such as for use in evacuating the bag, inlet tube 19, such as for use in introducing plasma into the bag, and another similar inlet tube 17, such as for introducing platelets into the bag. The tubes 17, 18 and 19 can be used interchangeably.

Further, each of the tubes 17, 18 and 19 is provided with a protective closure which forms a bag 17a, 18a and 19a, respectively, over each of the tubes. Each of the bag portions 17a, 18a and 19a over the tubes is formed by means of a weld seal at its base and by a peelable seal 16 between the base portion and the tab or free end portions of the sheets 13, 13'. The tab or free end portions of the sheets 13, 13' serve as gripping means for opening the peelable seal.

It is important, in providing the protective closures 17a, 18a 19a to assure that the tubes 17, 18 and 19 are not only sealed sufficiently air-tight by the enclosures 17a, 18a, 19a to ensure complete sterilization but sealed in such a manner that, when the protective closure is to be unsealed, it can be opened easily and reliably without breaking off. The platelet bag of this invention utilizes a polyethylene film wherein selected portions of the surface of the film have been oxidized by utilization of an open flame or corona discharge, or by any other convenient means. It has been found that polyethylene with oxidized surfaces can be heat-sealed in a manner to provide a peelable seal.

The tear strength of the seal is dependent upon many factors, including the density of the polyethylene film, the temperature and pressures applied, etc. The surface treatment of the polyethylene with corona discharge has been found to be effective by producing a surface energy of about 30–50 dynes/cm.

It has been found to be desirable to include a burstable seal 20 below the evacuation port 18. The seal 20 bridges diagonally across below the port 18 to prevent back-flow into the port after the bag has been filled. When the bag is ready for evacuation, the bag is squeezed sufficiently to cause the internal pressure of either the trapped air and/or liquid to break the low strength seal and permit the contents of the bag to flow out through the port.

It has been further found to be advantageous to provide additional peelable seals in protective closures 18a and 19a, one positioned close to the plasma inlet 18 and the other close to the platelet inlet 19, as illustrated in FIG. 1 by the members 16a, 16a' and 16b'. By positioning the seals close to the tubes 18 and 19, an air pocket is created within the protective closures 18a and 19a which prevents the unwanted flow of fluid by capillary action when only one of the inlets 18 or 19 is being utilized. Alternatively, after filling, the bag may be re-sealed below the inlets 18, 19 to prevent any back-flow.

Optionally, the weld seal 14 at the lower portion of the bag 10 may be extended beyond the periphery of the bag so as to include portions 14a which provide supporting strength about the area of the lower holes 11.

Tube 17 may be provided with a puncturable membrane 22 to prevent back-flow of material into the tube. However, the use of a burstable seal has been found to be preferable to prevent back-flow since inadvertent punctures are avoided.

Slits 23, 24 are provided so as to permit independent opening of the protective enclosures.

The free end portions 13, 13' of the sheets serve as a gripping means for the medical technician so as to break the seal of each of the enclosures 17a, 18a, 19a, and permit access to the tubes 17, 18, 19 as required.

In connection with the maintenance of sterility, since the protective closure is readily manually peeled there is little possibility that germs sticking to the free end portion or protective closure may fall into the port as the tab is turned over. Also, with the peelable seal there is an insurance of the integrity of the seal until the bag is utilized.

The tubes 17, 18, 19 may also include a ridge or spherical enlargement on its outer diameter so as to provide a convenient and simple means for adapting the bag to any of a variety of blood storage applications, including the storage of various blood components and the freeze storage of red blood cells.

Figure 2:
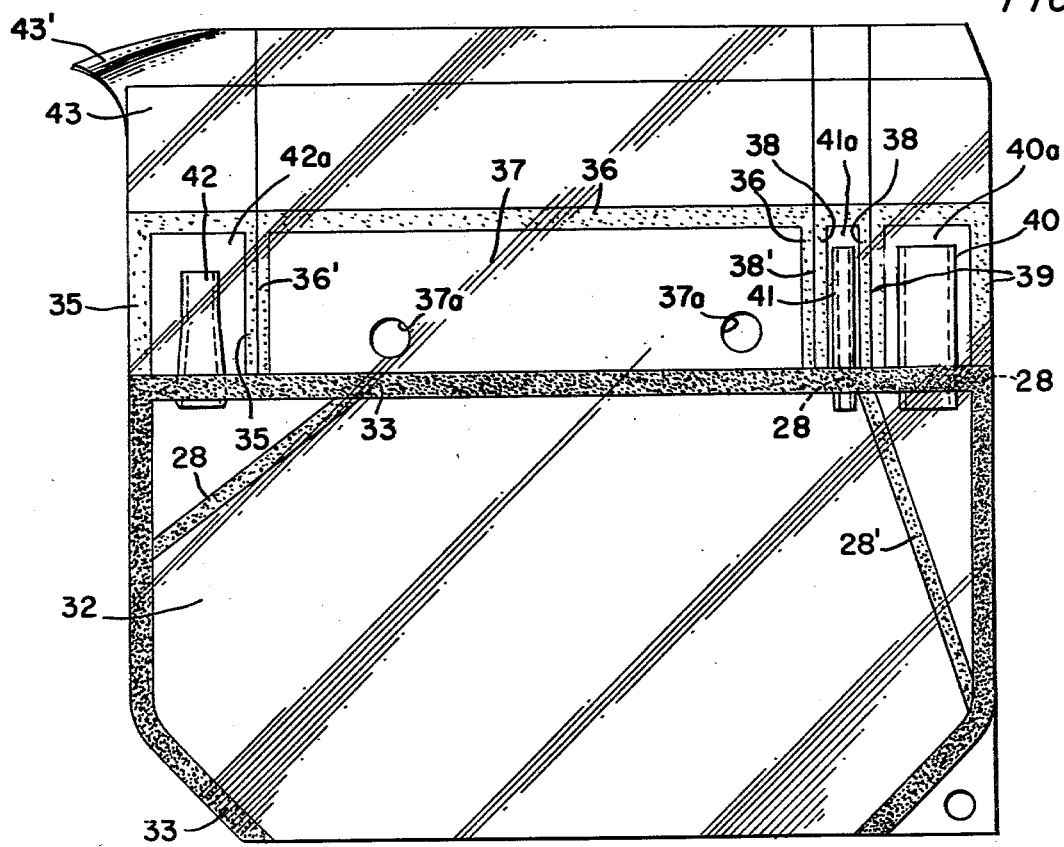
FIG. 2 is a similar view of a still further form of platelet storage bag according to the present invention having a modified form of peelable seal and burstable seal.

FIG. 2 illustrates a further embodiment of the present invention wherein there is shown a platelet freezing bag having a bag portion 32 that is formed by folding an oxidized polyethylene film and appropriately sealing in the desired manner. The bag 32 contains at its upper periphery an evacuation tube 42 about one upper corner with a burstable seal 28 bridging diagonally across below the tube 42. Inlet tubes 40 and 41 are formed about the other upper corner with a burstable seal 28' bridging diagonally across below tube 40. Each of the tubes 40, 41 and 42 is covered by a protective enclosure 40a, 41a, 42a, respectively, which is formed by the selective formation of peelable seals 36, 38 and 39 as shown in the drawing together with the weld seal 33 at the upper portion of the bag 32. The seals 35, 36, 38 and 39 are then selectively slit so as to form individual enclosures 40a, 41a, 42a for each of the tubes 40, 41 and 42. By forming a selective pattern of a peelable seal and selectively slitting the bag there is formed an individual protective enclosure for each of the openings into the bag. Thus, tubes 40, 41 and 42 are provided with a protective closure by means of the weld seal 33 at their base and peelable seal portions 35, 38 and 39 that are made into individual units by slits 36', 38' and 39'. Slits 36' and 38' are placed into the seal portion such as to result in the formation on an individual pocket 37 having a peelable seal portion 36 that is suitable for holding a label. If desired, the bag may be provided with holes 37a for placing the bag on a holding rack. Each of the enclosures 40a, 41a, 42a, is provided with tab portions 43, 43' which serves as a gripping means for opening the peelable seal. It has been found to be further advantageous to have one tab portion 43 shorter than the other tab portion and to form the peelable seal into a configuration having a narrow portion or point as shown so as to facilitate gripping of the tabs and opening of the peelable seal.

Figure 3:
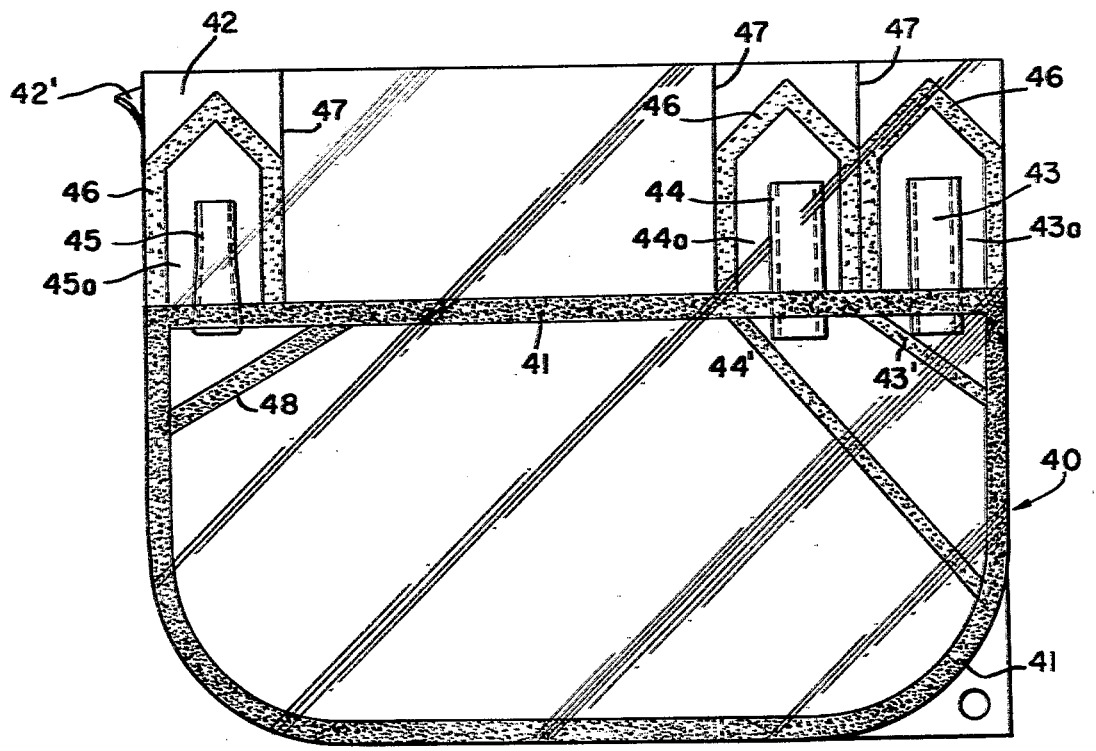
FIG. 3 is a similar view of another form of platelet storage bag according to the present invention.

FIG. 3 illustrates a further embodiment of the present invention wherein there is shown a platelet freezing bag 40 with a weld seal 41 along its periphery of the bag which joins oxidized polyethylene sheets 42, 42' into bag form. Formed on the upper portion of the bag 40 is a platelet inlet tube 43 with a burstable seal 43' along its lower portion, plasma inlet tube 44 with a burstable seal 44' at its lower portion, and an evacuation tube 45 with a burstable seal 48 along its lower portion. A peelable seal 46 is provided above and along the sides of the tubes 43, 44, 45 so as to form protective enclosures 43a, 44a, 45a, together with the weld seal 41 at the upper portion of the bag 40 around each of the tubes 43, 44, 45. Slits 47 separate each of the protective enclosures from one another and the seal 46 has a pointed configuration so that the medical technician is able to easily utilize either tube 43, 44, 45 without disrupting the integrity of the other ports. Also, each of the burstable seals 43', 44' and 48 seal below the tubes to protect the integrity of the bag and to prevent flow into the unused tube after the bag has been filled. The seals 43', 44' and 48 are made low strength so as to permit breaking of the seal by squeezing the bag with its contents and air acting as the breaking force. Each of the seals 43', 44' and 48 may be of variable strengths so that one seal could be broken without disrupting the other seals. An advantage of the present storage bag is that the front and back plastic sheets and the protective closure may be of the same material and thickness. The peelable seal is unfailingly peeled open without opening any weld seal. Further, the joint between the protective closure and the seals around the inlets act as stoppers.

Figure 4:
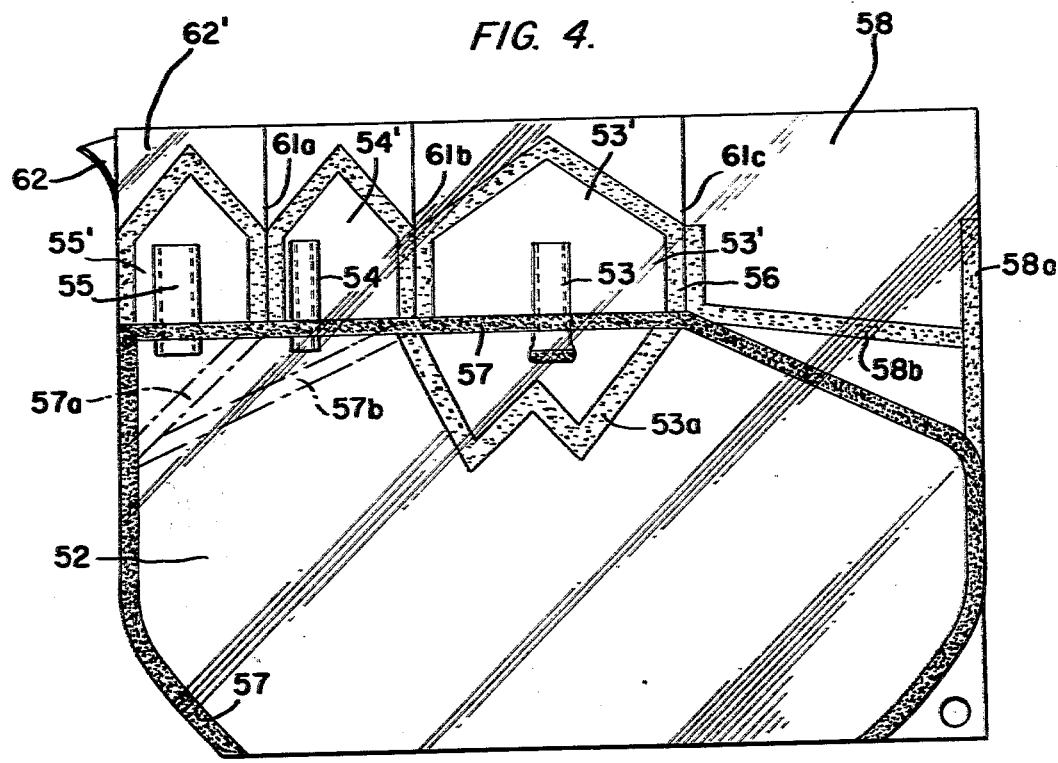
FIG. 4 is a similar view of still another form of platelet storage bag according to the present invention.

As seen in FIG. 4, a platelet freezing bag having a bag portion 52 is formed by folding an oxidized polyethylene film and appropriately sealing in the desired manner. The bag 52 contains at its upper periphery a tube 53 for use in evacuating the bag after filling, and a pair of tubes 54 and 55 for use as inlets. Each of the tubes 53, 54 and 55 is covered by a protective enclosure 53', 54' and 55' which is created by the selective formation of a peelable seal 56 as shown in the drawing. If desired, the peelable seal between each tube 53, 54, 55 is slit along point 61a, 61b, 61c so as to form individual enclosures having the individual gripping means 62, 62' formed from the free end portions of the sheet. Thus, tube 53 is provided with a protective closure by means of the weld seal 57 at its base and the peelable seal portion 56 that is separated from the enclosure 54' by means of a slit 61b. The tube 54 is provided with a protective closure 54' by means of the weld seal at its base 57 and the peelable seal 56 that is slit at 61a and 61b. A pocket 58 may be formed that is suitable for holding identification means by including additional weld seals 58a and 58b in the free end portion as shown in the drawing. Also, seals 57a, 57b may be provided, bridging diagonally across below the tubes 54 and/or 55 to prevent backflow after the bag has been filled. Seals 57a and 57b may be either burstable, peelable or weld seals depending upon further use of the tubes 54, 55. A burstable seal 53a encloses the bottom of tube 53 to protect the integrity of the tube until used.

It is understood that the present invention may be utilized in connection with other blood pack systems such as in the collection, preparation, storage or administration of whole blood or blood components, or other parenteral systems.

It is further understood that the term "weld seal" is meant to include a peelable seal of high strength as well as a fusion seal.

It should be understood that this invention is not limited to those embodiments and that the appended claims are intended to include these and other features and embodiments as may be devised by those skilled in the art which are nevertheless within the spirit and scope of this invention.

I claim:

1. In a bag for storing blood components consisting of a sterilizable, flexible closed polyolefin container including at least two inlets at the top thereof forming part of said closed container, each of said inlets being hermetically enclosed by a bag-like protective closure, said protective closure being integral with said bag and formed by heat-sealing under combined application of heat and pressure a portion of at least two polyolefin film members having therebetween at least one surface oxidized by corona treatment so that the seal is peelable to expose each of said inlets, the improvement which comprises a burstable seal below at least one of said inlets, said burstable seal being formed by heat sealing under combined application of heat and pressure a portion of said seal having a surface oxidized by corona treatment therebetween which is capable of breaking by the application of fluid pressure.

2. A bag according to claim 1, including at least one port on a side of said inlets for removing the contents from said bag, said port being hermetically enclosed by a bag-like protective closure, and a burstable seal about the lower portion of said port.

3. The bag according to claim 1 including an envelope at the top of said bag for holding identification means.

4. The bag according to claim 1 wherein the peelable seal has a pointed configuration so as to facilitate uniform peeling.

5. The bag according to claim 1 including gripping means for peeling said seal.

6. The bag according to claim 1 wherein said bag is weld sealed along at least three sides.

7. The bag according to claim 1 wherein the entire inside surface of said bag is oxidized by corona discharge.

8. The bag according to claim 1, including means for holding said bag in an inverted position.

9. The bag according to claim 1 wherein said container is formed from corona treated polyolefin film whereby the container is formed with the interior surface already corona treated.

10. In a polyethylene bag for storing blood components, the improvement which comprises said bag being oxidized on its interior surface and having inlet means for introducing blood platelets into said bag and outlet means for evacuating said bag, said outlet means having a burstable seal formed by heat sealing under combined application of heat and pressure a portion of said seal having a surface oxidized by corona treatment therebetween for sealing said outlet means from the contents in said bag.

11. The bag according to claim 10, including protective means enclosing each of said inlet means and outlet means so as to prevent contamination and to create a back pressure.

12. A blood platelet storage container comprising a sterilizable, flexible closed polyethylene bag, having the entire inside surface oxidized by corona treatment free end portions oxidized by corona treatment at the upper periphery of said bag, at least two inlet tubes being part of said container and formed along the upper periphery of said bag, and evacuation tube sealed in the upper periphery of said bag, each of said tubes being hermetically enclosed by a bag-like protective closure, said protective closure being integral with said bag and formed by heat-sealing together under combined application of heat and pressure a part of the oxidized surfaces of said free end portions around each of said tubes without opening the periphery of said bag, and said evacuation tube being further sealed about its lower end portion by a burstable seal formed by heat sealing under combined application of heat and pressure a portion of said seal having a surface oxidized by corona treatment therebetween so that said evacuation tube is completely sealed by a protective enclosure.

13. The container according to claim 12 including gripping means formed by a part of said free end portions.

14. The container according to claim 12 including a pair of peel seals on said bag-like closure positioned close to each of said small diameter inlet tubes so as to create an air pocket with the protective closures of each tube.

15. The container according to claim 12 including seals bridging diagonally across below said inlet tubes.

16. The container according to claim 12 including an envelope formed at the top of said bag for holding identification means.

17. A blood platelet storage container comprising a sterilizable, flexible closed polyethylene bag having the interior surface and free end portions at its upper periphery oxidized by corona discharge, said bag including two inlet tubes, an evacuation tube and an envelope at its upper periphery, each of said inlet tubes being hermetically enclosed by a bag-like protective closure, said protective closure being integral with said bag and formed by heat sealing together a part of said oxidized surfaces of said free end portions around each of said tubes so that the seal formed is peelable to expose each tube without opening the periphery of said bag, said envelope being formed by having free end portions sealed along their sides, and a burstable seal formed by heat sealing under combined application of heat and pressure a portion of said container so as to bridge across below said evacuation tube whereby said burstable seal is capable of breaking by the application of fluid pressure.

* * * * *